United States Patent [19]

Hiramitsu et al.

[11] Patent Number: 5,613,700

[45] Date of Patent: Mar. 25, 1997

[54] AIR BAG DEVICE

[75] Inventors: Tetsushi Hiramitsu, Aichi; Koji Shiraki, Gifu; Yasunori Iwai, Osaka; Masakazu Tokuda, Hyogo, all of Japan

[73] Assignee: Toyoda Gosei Co., Ltd., Aichi, Japan

[21] Appl. No.: 563,379

[22] Filed: Nov. 28, 1995

[30] Foreign Application Priority Data

Nov. 29, 1994 [JP] Japan .................................. 6-295195

[51] Int. Cl.⁶ .................................................. B60R 21/16
[52] U.S. Cl. ........................................ 280/728.2; 280/741
[58] Field of Search .............................. 280/728.2, 741, 280/731, 732

[56] References Cited

U.S. PATENT DOCUMENTS

| | | | |
|---|---|---|---|
| 5,141,247 | 8/1992 | Barth | 280/728.2 |
| 5,275,431 | 1/1994 | Stephens | 280/728.2 |
| 5,320,379 | 6/1994 | Burnard et al. | 280/728.2 |
| 5,547,213 | 8/1996 | Lang et al. | 280/728.2 |

FOREIGN PATENT DOCUMENTS

| | | |
|---|---|---|
| 4-138953 | 5/1992 | Japan . |
| 4-266545 | 9/1992 | Japan . |

*Primary Examiner*—Kenneth R. Rice
*Attorney, Agent, or Firm*—Cushman Darby & Cushman IP Group of Pillsbury Madison & Sutro LLP

[57] ABSTRACT

An air bag device includes a folded air bag, an inflator for supplying air to the air bag to inflate the bag, and a bag holder for holding the air bag and the inflator. Protrusions are formed on the outer surface of the inflator. The bag holder has a bottom wall with an insertion hole. The inflator is inserted into the insertion hole from the lower side of the bag holder. Pawls are upwardly extended from the circumferential edges of the insertion hole in the inward direction. The inflator is held by the bag holder in a state that the pawls retain the lower surface of the protrusions.

10 Claims, 3 Drawing Sheets 5,613,700

AIR BAG DEVICE

FIELD OF THE INVENTION

The present invention relates to an air bag device that may be installed in a steering wheel, an instrument panel in front of the passenger's seat, doors, seats and the like in an automobile. More particularly, the invention relates to the structure for coupling an inflator for supplying gas to the air bag to inflate the bag into the bag holder for holding the air bag.

BACKGROUND OF THE INVENTION

By convention, this type of the air bag device includes a folded air bag, an inflator for supplying gas to the air bag to inflate the bag, a pad for covering the folded air bag, and a bag holder for holding the air bag, the inflator, and the pad as disclosed in Japanese Patent Publication No. Hei. 4-138953 and the like. The bag holder has a bottom wall with an insertion hole into which the inflator is inserted from the lower side of the bag holder. The inflator is provided with a flange that is in contact with a location on the bottom wall of the bag holder that is close to the insertion hole of the bottom wall.

A plural number of mounting holes are formed in the bottom wall of the bag holder and the flange of the inflator. To couple the inflator into the bag holder, those holes of the holder and the inflator are aligned with each other, bolts are inserted into the holes, and nuts are applied to the bolts.

As described above, in the conventional air bag device, the flange is formed on the inflator. The plural number of mounting holes are formed in the flange. The mounting holes must be large enough to receive the bolts. Therefore, the flange must be wide so as to allow the large holes to be formed therein. This results in increase of the weight of the inflator.

The conventional inflator of which the outer surface is made of metallic material, e.g., aluminum alloy, is formed by mold forging of the metallic material. The flange of the inflator is also formed in a hammering manner, during the mold forging process. Therefore, several kinds of molds are required. Further, mounting holes are formed in the thus formed flange. Thus, the manufacturing work of the conventional inflator requires a number of manufacturing process steps and a high cost to manufacture.

Before the vehicle is disused, the inflator must be removed. In this case, a worker unscrews a number of nuts and removes the bolts. Thus, much work is required for the inflator removal.

Another inflator-bag holder coupling structure is disclosed in Japanese Patent Publication No. Hei. 4-26654. In the structure, the bolts and nuts are not used, while a retainer with clamping pawls is used. The clamping pawls are caulked to couple the inflator with the bag holder. Much labor is required to remove the inflator thus clamped.

SUMMARY OF THE INVENTION

Accordingly, an object of the present invention is to provide an air bag device which is reduced in weight owing to the weight reduction of an inflator, and in the number of manufacturing process steps and the cost to manufacture, and provides an easy removal of the inflator.

According to a first aspect of the present invention, there is provided an air bag device comprising: an air bag; a inflator for supplying air to the air bag; and a bag holder for holding the air bag and the inflator, the bag holder including a bottom wall with an insertion hole into which the inflator being inserted from the lower side of the bag holder; wherein retaining means is formed on the outer surface of the inflator, a plurality of pawls are formed upwardly and inwardly extended from the circumferential edge of the insertion hole, and the inflator is held by the bag holder in a manner that the pawls are retained by the retaining means.

According to a second aspect of the present invention, in the air bag device according to the first aspect of the invention, the retaining means comprises a plurality of protrusions, the protrusion is formed so that a plurality of recesses are formed on the surface of the inflator and the inner upper walls of the recesses serve as the protrusions.

According to a third aspect of the present invention, in the air bag device according to the second aspect of the invention, a tapered surface is formed at the upper portion of the inflator, and the tapered surface is expanded outward and downward from the top of the inflator to the above of the recesses.

According to a fourth aspect of the present invention, in the air bag device according to the first aspect of the invention, the retaining means comprises a protrusion surrounding the inflator which is formed in a manner that a tapered surface expanded outward and downward from the top of the inflator is formed at the upper portion of the inflator, the lower portion of the inflator straightly extended in the vertical direction and the radius of the lower portion of the inflatior is smaller than that of the lower end of the tapered surface, so that the protrusion is formed at the lower end of the tapered surface.

According to a fifth aspect of the present invention, in the air bag device according to the first aspect of the invention, a turn-stop mechanism for stopping the turn of the inflator in its circumferential direction are formed at the inflator and the bag holder.

According to a sixth aspect of the present invention, the air bag device according to the first aspect of the invention further comprises a cover covering the lower part of the inflator and attached to the bag holder, the cover including a leg and the inflator including a groove, wherein the leg is inserted into the groove so that the turn of the inflator in its circumferential direction is stopped.

DETAILED DESCRIPTION OF THE PREFERRED EMBODIMENTS

The preferred embodiments of an air bag device according to the present invention will be described with reference to the attached drawings.

Figure 1:
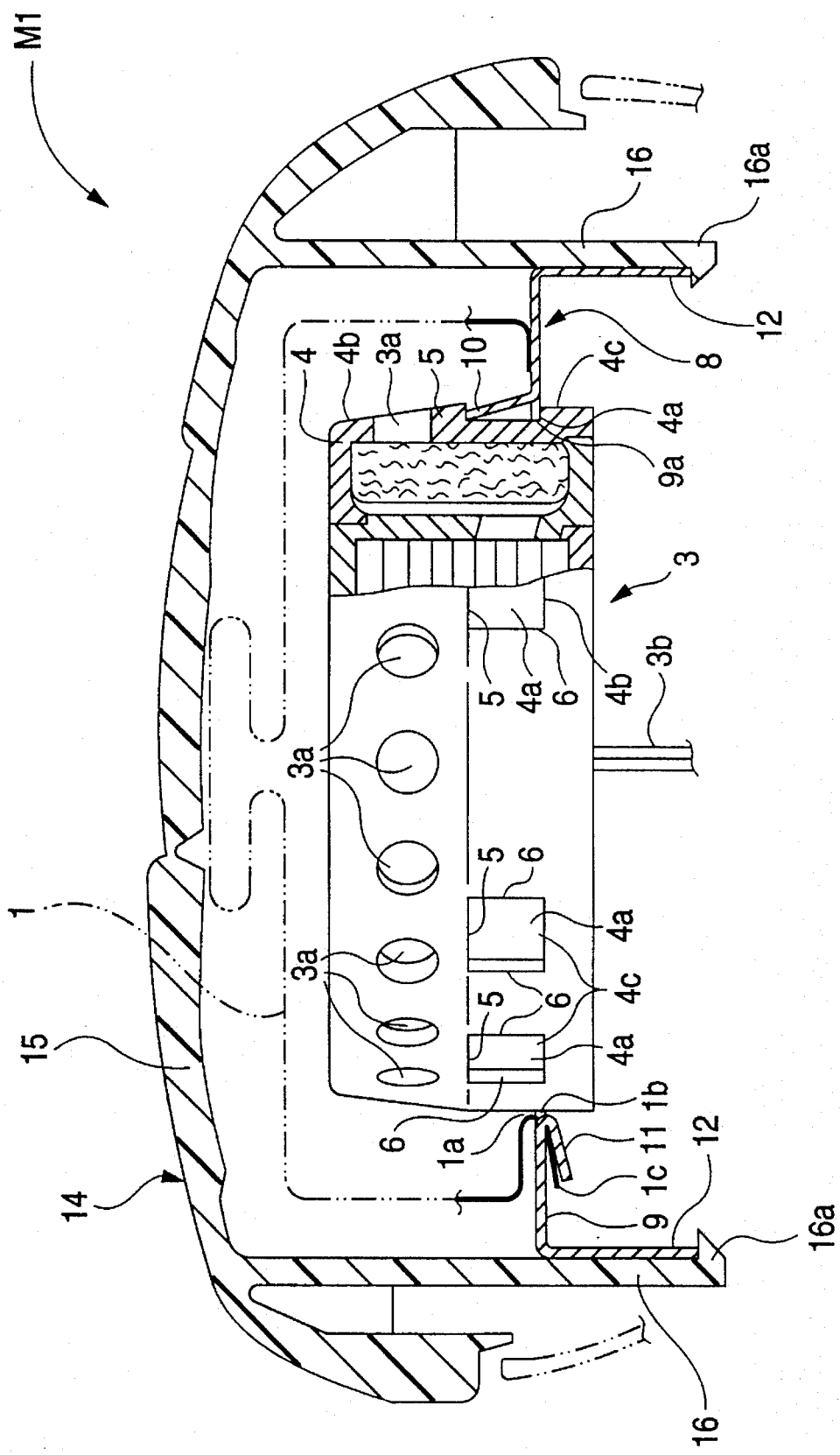
FIG. 1 is a cross sectional view showing an air bag device according to a first embodiment of the present invention, the view being taken on line I—I in FIG. 2.

The air bag device M1, which is a first embodiment of the present invention, is assembled into a steering wheel. As shown in FIG. 1, the air bag device M1 comprises an air bag 1 in the form of a folded bag, an inflator 3 for supplying air to the air bag 1 to inflate the bag, a pad 14 for covering the folded air bag 1, and a bag holder 8 for holding the air bag 1, the inflator 3, and the pad 14.

Figure 2:
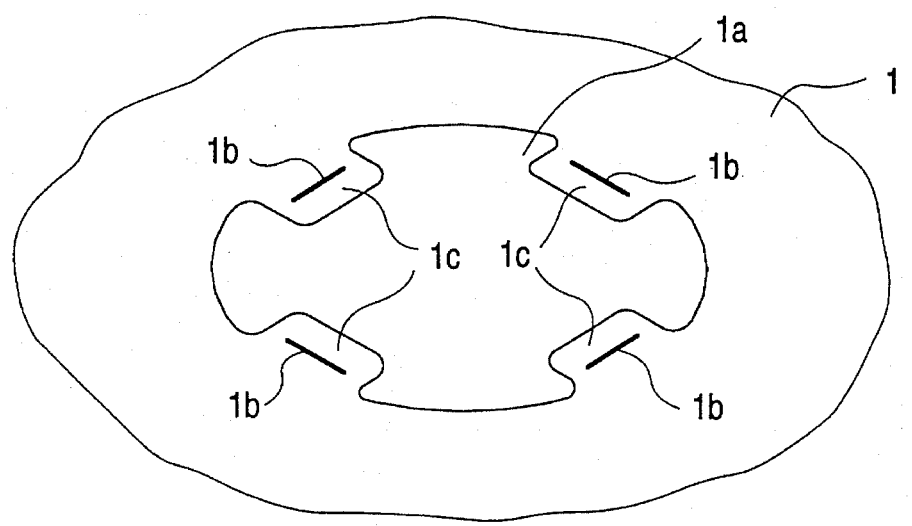
FIG. 2 is a perspective view showing an air bag, a bag holder and an inflator of the air bag device.
Figure 2:
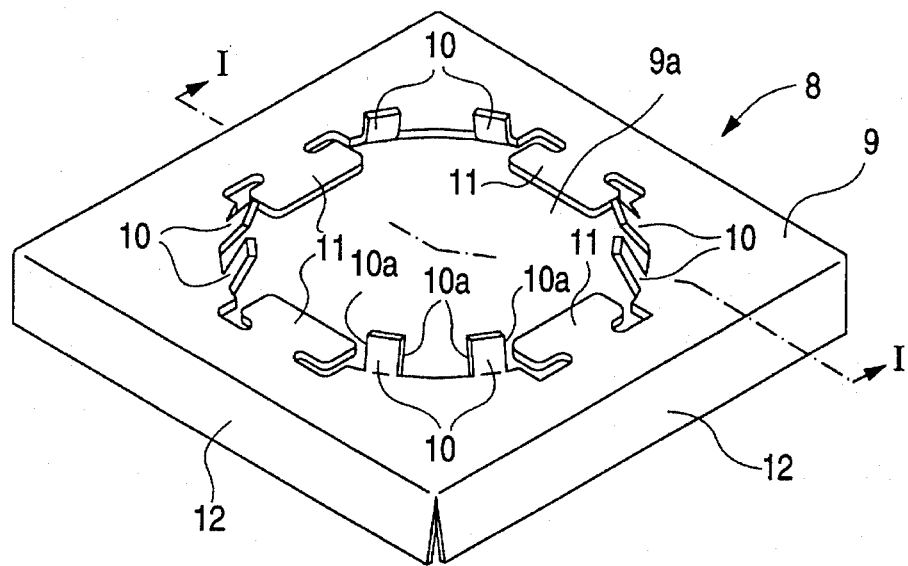
Figure 2:
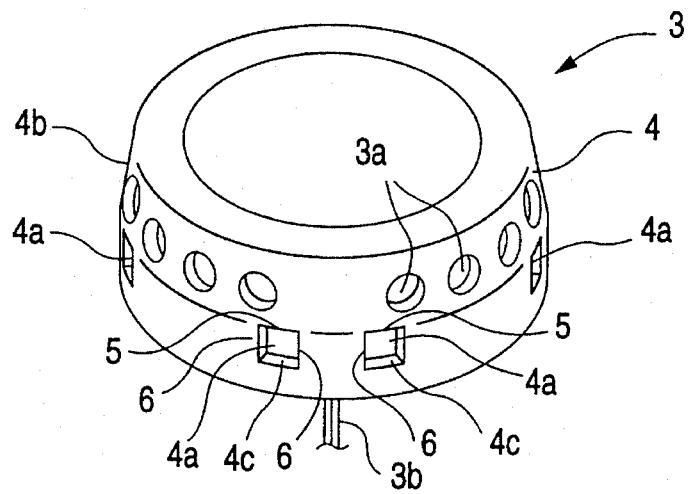

The air bag 1 is formed like a substantially spherical inflatable bag. As shown in FIGS. 1 and 2, the air bag 1 has a gas inflow port 1a, substantially circular, through which gas supplied from the inflator 3 flows into the air bag 1. Mounting parts 1c having mounting holes 1b are expanded inward from four locations, equidistantly arrayed, on the circumferential edge of the gas inflow port 1a. The mounting parts 1c with the mounting holes 1b are used for attaching the air bag 1 to the bag holder 8.

The inflator 3 has a plural number of gas discharge ports 3a in the upper portion thereof and is surrounded by an outer wall 4 made of aluminum alloy and the like. A plural number of recesses 4a are formed in the lower portion of the outer wall 4. The inner upper wall of each of those recesses 4a serves as protrusions 5 to which a pawl 10 (to be described later) of the bag holder 8 is hooked. The inner side walls of each of those recesses 4a serve as turn-stop means 6 for stopping the turn of the inflator 3. A tapered surface 4b expanded outward and downward is formed in the upper portion of the outer wall 4b, that is, above the recesses 4a.

The bag holder 8 consists of a rectangular bottom wall 9 and four side walls 12 raised from the four sides of the bottom wall 9. The bag holder 8 is formed by bending a metal sheet.

An insertion hole 9a is formed in the bottom wall 9. The inflator 3 is inserted into the insertion hole 9a from its lower side. Eight pawls 10 are upwardly and inwardly extended from the circumferential edge of the insertion hole 9a. Four mounting lugs 11 are also extended inward from the circumferential edge of the insertion hole 9a.

The pawls 10 retain the lower surface of the protrusions 5 of the inflator 3, respectively. The mounting lugs 11 are inserted into the mounting holes 1b of the air bag 1 in the direction from the outside of the circumferential edge of the gas inflow port 1a to the inside thereof, and folded downward, to thereby fasten the air bag 1 to the bottom wall 9 of the bag holder 8.

The pad 14 is made of synthetic resin and comprises a ceiling wall 15 and a surrounding wall 16 shaped rectangular in cross section. The ceiling wall 15 is broken when the air bag 1 is expanded. The surrounding wall 16 is raised downward from the four sides of the ceiling wall 15 while surrounding the folded air bag 1, and has hooks 16a formed at the end thereof. The hooks 16a engage with ends of the side walls 12.

How to assemble the air bag device M1 will be described hereinunder. The mounting lugs 11 of the bag holder 8 are inserted into the mounting holes 1b of the air bag 1, and bent. Thus, the air bag 1 is firmly attached to the bag holder 8. Then, the air bag 1 is folded.

The inflator 3 is inserted into the insertion hole 9a of the bottom wall 9 of the bag holder 8, from the lower side of the bag holder 8. In this case, the inflator 3 is inserted into the insertion hole 9a while pushing outward the pawls 10 of the bag holder 8, with the pawls 10 brought into contact with the tapered surface 4b. The insertion is continued till the pawls 10 are brought into contact with the inner upper walls of the recesses 4a, i.e., the lower surface of the protrusions 5. In this way, the bag holder 8 is firmly attached to the inflator 3.

Thereafter, the pad 14 is applied to the assembly of the air bag 1, the bag holder 8, and the inflator 3 from the top of the assembly, and pushed down till the hooks 16a of the pad 14 catch the tops of the side walls 12 of the bag holder 8. In this way, the air bag device M1 is assembled.

Then, the air bag device M1 thus assembled is fixed to the steering wheel by using nuts (not shown) of the side walls 12 of the bottom wall 9.

In the air bag device M1 of the present invention, the bag holder 8 holds the inflator 3 in such a manner that the pawls 10 retain the lower surface of the protrusions 5 of the recesses 4a. Accordingly, a designer only has to form the protrusion 5 in the outer wall 4 of the inflator 3 in order that the bag holder 8 holds the inflator 3. There is no need of protruding the protrusion 5 long enough to allow the mounting holes to be formed therein, although the flanges are used for the same purpose in the conventional device. This leads to reduction of the weight of the inflator 3. Further, the protrusion 5 may easily be formed when the outer wall 4 of the inflator 3 by forging process, since the amount of the protrusion 5 is smaller than that of the flange provided with mounting holes. In the present emodiment, it is more efficient to form shallow recesses 4a in the outer wall 4 in manufacturing the products. In this case, it can easily be manufactured by stamping a thin plate. Thus, the weight reduction of the inflator 3 and the easy forming of the outer wall 4 of the inflator 3 can be achieved.

To remove the inflator 3 from the bag holder 8 after assembly of the air bag device, the pad 14 is first removed, and then the inflator 3 is moved upward. Then, the pawls 10 of the bag holder 8 are detached from the protrusion 5 of the outer wall 4 of the inflator 3, and the inflator 3 is smoothly removed from the bag holder 8, since the pawls 10 of the bag holder 8 is upwardly and inwardly bent, and elastically contact with the tapered surface 4b of the inflator 3.

As seen from the foregoing description, the air bag device M1 is reduced in weight since the weight of the inflator 3 is reduced. The manufacturing process is simplified since no flange is used. The simplified manufacturing process leads to reduction of cost to manufacture. The removal of the inflator 3 is easy.

Also in the first embodiment of the present invention, the protrusion 5 are formed on the upper portion 4b of the outer wall 4 of the inflator 3. The upper portion 4b is tapered outward and downward from the top thereof to the bottom. With this structure, when the inflator 3 is inserted into the insertion hole 9a of the bottom wall 9 of the bag holder 8 from downward, the pawls 10 of the bag holder 8 are smoothly guided along the tapered surface 4b of the inflator 3, and come in contact with the inner upper wall of the recesses 4a, viz., the lower surface of the protrusions 5. Therefore, it is easy to couple the inflator 3 into the bag holder 8.

Figure 3:
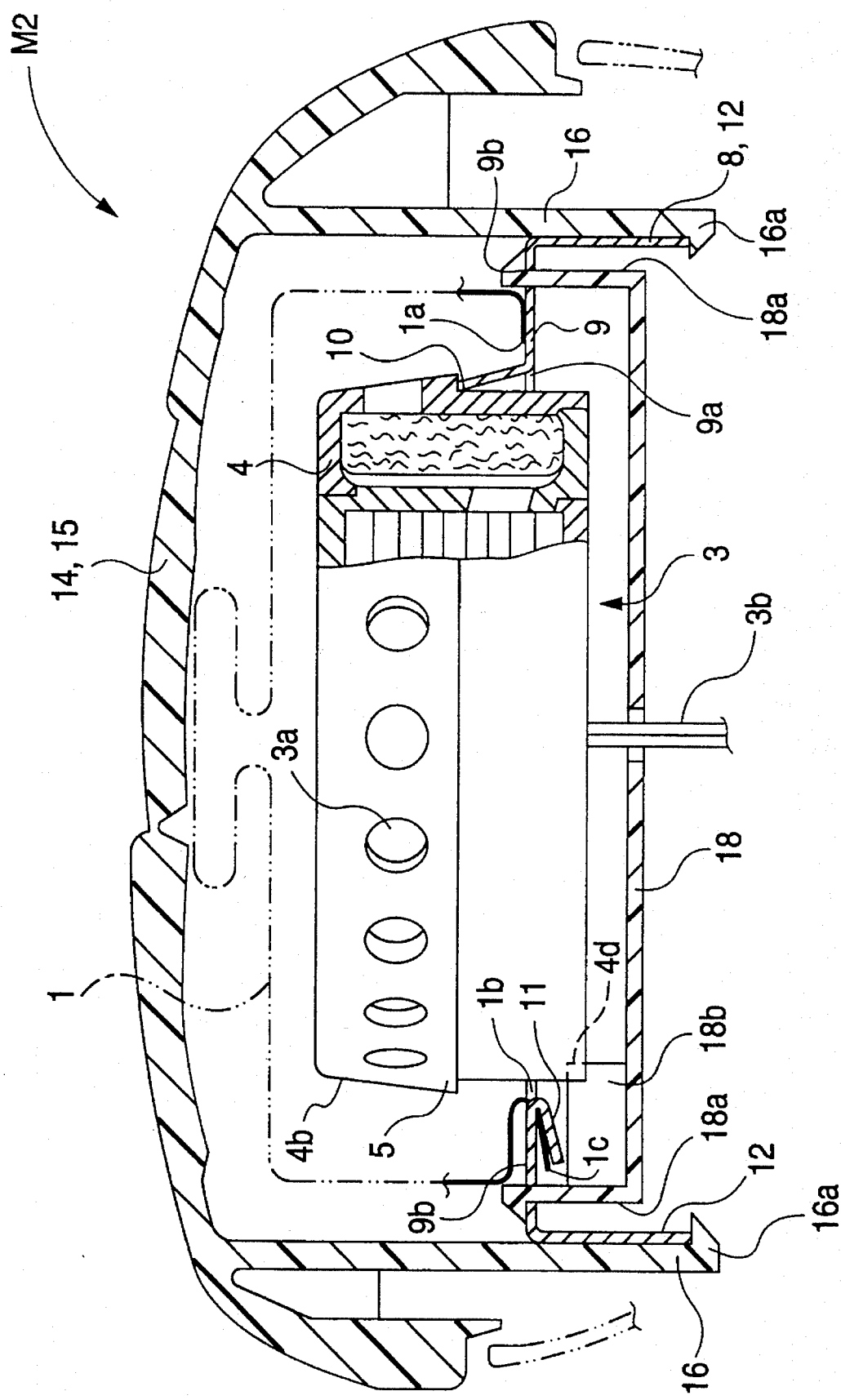
FIG. 3 is a cross sectional view showing a second embodiment of an air bag device according to the present invention.

In the first embodiment thus far described, the plural number of the recesses 4a are formed in the outer wall 4 of the inflator 3. The inner upper walls of the recesses 4a serve as the protrusions 5 which are brought into contact with the pawls 10. On the other hand, a second embodiment of the present invention is shown in FIG. 3. The lower portion of the outer wall 4 is straightly extended in the vertical directions. In other words, the lower portion of the protrusion 5 does not protrude contrary to the first embodiment as shown in FIG. 1. In the air bag device M2 of the second embodiment, any part corresponding to the inner lower walls of the recesses 4a is not formed just like the air bag device of the first emodiment. So one may think that the inflator 3 shifts up. Actually, the inflator 3 never shifts up, however, because the upward movement of the inflator 3 is barred by the folded air bag 1.

Further, the air bag device M1 is provided with a mechanism for stopping the turn of the inflator 3 in the circumferential directions. In the turn-stop mechanism, the side faces 10a (FIG. 2) of the pawls 10 of the bag holder 8 come in contact with the inner side walls (as turn-stop means 6) of the recesses 4a of the inflator 3, whereby the inflator 3 is immovable in the circumferential directions. Accordingly, any load does not act on a lead wire 3b for a signal to start the discharging of gas that is connected to the inflator 3.

As just mentioned, the turn-stop mechanism of the air bag device M1 includes the turn-stop means 6 and the pawls 10. Another turn-stop means is shown in FIG. 3. In the air bag device M2 shown in FIG. 3, the turn-stop mechanism is constructed utilizing the inflator 3 and a cover 18, made of synthetic resin, for covering the lower part of the inflator 3 firmly attached to the bag holder 8. The cover 18 is provided for protecting a connection part of a lead wire 3b to the inflator 3. The cover 18 is fastened to the bag holder 8. In this case, legs 18a of the cover 18 are inserted into holes 9b that are formed in the peripheral part of the insertion hole 9a of the bag holder 8. The turn-stop mechanism includes a protrusion piece 18b protruded from the cover 18 and a groove 4d that is formed in the outer wall 4 of the inflator 3 and receives the protruded piece 18b. In this mechanism, the protruded piece 18b of the cover 18 that is fixed to the bag holder 8 by means of the legs 18a, is inserted into the groove 4d, to thereby stop the turn of the inflator 3.

In the air bag devices M1 and M2, the air bag 1 as well as the inflator 3 is firmly attached to the bag holder 8 not using the combination of bolts and nuts or the like, and further the pad 14 is firmly attached to the bag holder 8 not using rivets, for example. For this reason, the number of necessary component parts is reduced. The manufacturing process is simplified, and the manufacturing cost is also reduced.

What is claimed is:

1. An air bag device comprising:

an air bag;

an inflator for supplying air to said air bag; and a bag holder for holding said air bag and said inflator, said bag holder including a bottom wall with an insertion hole into which said inflator being inserted from the lower side of said bag holder;

wherein retaining means is formed on the outer surface of said inflator, a plurality of pawls are formed upwardly and inwardly extended from the circumferential edge of the insertion hole, and said inflator is held by said bag holder in a manner that the pawls are retained by the retaining means.

2. The air bag device according to claim 1, wherein the retaining means comprises a plurality of protrusions, the protrusion is formed so that a plurality of recesses are formed on the surface of said inflator and the inner upper walls of the recesses serve as the protrusions.

3. The air bag device according to claim 2, wherein a tapered surface is formed at the upper portion of said inflator, and the tapered surface is expanded outward and downward from the top of said inflator to the above of the recesses.

4. The air bag device according to claim 1, wherein the retaining means comprises a protrusion surrounding said inflator which is formed in a manner that a tapered surface expanded outward and downward from the top of said inflator is formed at the upper portion of said inflator, the lower portion of said inflator straightly extended in the vertical direction and the radius of the lower portion of said inflator is smaller than that of the lower end of the tapered surface, so that the protrusion is formed at the lower end of the tapered surface.

5. The air bag device according to claim 1, wherein a turn-stop mechanism for stopping the turn of said inflator in its circumferential direction are formed at said inflator and said bag holder.

6. The air bag device according to claim 1, further comprising a cover covering the lower part of said inflator and attached to said bag holder, said cover including a leg and said inflator including a groove, wherein the leg is inserted into the groove so that the turn of said inflator in its circumferential direction is stopped.

7. The air bag device according to claim 3, wherein a turn-stop mechanism for stopping the turn of said inflator in its circumferential direction are formed at said inflator and said bag holder.

8. The air bag device according to claim 3, further comprising a cover covering the lower part of said inflator and attached to said bag holder, said cover including a leg and said inflator including a groove, wherein the leg is inserted into the groove so that the turn of said inflator in its circumferential direction is stopped.

9. The air bag device according to claim 4, wherein a turn-stop mechanism for stopping the turn of said inflator in its circumferential direction are formed at said inflator and said bag holder.

10. The air bag device according to claim 4, further comprising a cover covering the lower part of said inflator and attached to said bag holder, said cover including a leg and said inflator including a groove, wherein the leg is inserted into the groove so that the turn of said inflator in its circumferential direction is stopped.

* * * * *